UNITED STATES PATENT OFFICE.

JOSEPH LE ROY WEBBER, OF SYRACUSE, NEW YORK.

FIRE-EXTINGUISHING COMPOSITION.

SPECIFICATION forming part of Letters Patent No. 569,731, dated October 20, 1896.

Application filed March 16, 1896. Serial No. 583,294. (No specimens.)

*To all whom it may concern:*

Be it known that I, JOSEPH LE ROY WEBBER, of Syracuse, in the county of Onondaga, in the State of New York, have invented new and useful Improvements in Fire-Extinguishing Compositions, of which the following is a full, clear, and exact description.

The object of my invention is to provide an improved vehicle for certain substances, such as carbon dioxid, (commonly called "carbonic-acid gas,") magnesium chlorid, hydrochloric acid, sodium chlorid, &c., which are employed as fire-extinguishing agents.

The fire-extinguishing liquids now employed will freeze when exposed to the extreme cold of winter weather, which is a serious objection, especially when such liquids are kept in yards, sawmills, barns, or other localities where there is no artificial heat.

To this end my invention consists, broadly, in the use of a concentrated aqueous solution of calcium chlorid, the degree of concentration being proportioned according to the temperature at which the liquid will congeal, taking into account the temperature to which the liquid is liable to be exposed.

Solutions of calcium chlorid can be invariably relied on in case of extreme cold, and for this reason have a great advantage over all other fire-extinguishing liquids heretofore employed, which become frozen and consequently useless.

A solution of calcium chlorid may be made to withstand the low temperature of minus 45° centigrade (minus 49° Fahrenheit) without freezing, and it is known and has been shown by reports prepared in the office of the Chief of the Weather Bureau of the United States Department of Agriculture that a temperature lower than 49° below zero Fahrenheit is seldom reached in the United States.

Solution calcium chlorid is superior to other substances not only on account of its non-freezing quality, but because of its cheapness, and also because of its non-poisonous nature even when combined with magnesium chlorid or carbon dioxid. There is no danger attending the use of my solution, while many fire-extinguishing solutions now in use are exceedingly dangerous to the user, as they depend upon the use of oil of vitriol.

In carrying out my invention in a practical way I first prepare a concentrated solution of calcium chlorid by dissolving one hundred pounds of crude calcium chlorid in one hundred pints of water. This solution has the specific gravity of about 1.35 at 60° Fahrenheit and when filtered or otherwise clarified is ready for use as a vehicle for magnesium chlorid, carbon dioxid, hydrochloric acid, &c.

The value of magnesium chlorid as a fire-extinguishing agent consists in rendering combustible material practically incombustible. Hydrochloric acid and carbon dioxid under pressure and contained in a suitable apparatus possess the property of extinguishing flame.

When the solution of calcium chlorid is combined with magnesium chlorid, I add to one hundred pints of the concentrated solution of calcium chlorid, as above described, ten pounds crystallized magnesium sulfate, and then apply heat to the liquid to hasten the chemical reaction, which results in the formation of a precipitate consisting of calcium sulfate, while the liquid portion contains magnesium chlorid and calcium chlorid in proper proportion for its use during extreme cold weather. The solution is then separated from the insoluble calcium sulfate by filtration or decantation after the calcium sulfate has settled to the bottom of the container. This solution can be diluted with water, the proportion of the latter being fixed according to the temperature at which it is desired that the liquid should not freeze.

What I claim is—

1. A fire-extinguishing liquid containing a concentrated solution of calcium chlorid and charged with carbon dioxid, as set forth.

2. A fire-extinguishing liquid containing a concentrated aqueous solution of calcium chlorid, magnesium chlorid, and charged with carbon dioxid, substantially as specified.

3. A fire-extinguishing liquid, containing a concentrated aqueous solution of calcium chlorid, magnesium chlorid, sodium chlorid and charged with carbon dioxid, substantially as specified.

In testimony whereof I have hereunto signed my name.

JOSEPH LE ROY WEBBER. [L. S.]

Witnesses:
 MARK W. DEWEY,
 H. M. SEAMANS.